G. W. DOVER.
DEVICE FOR CASTELLATING NUTS.
APPLICATION FILED DEC. 6, 1918.

1,315,289.

Patented Sept. 9, 1919.

INVENTOR:
George William Dover
By Chas. H. Luther
ATTORNEY.

UNITED STATES PATENT OFFICE.

GEORGE WILLIAM DOVER, OF CRANSTON, RHODE ISLAND, ASSIGNOR TO GEORGE W. DOVER, INCORPORATED, OF PROVIDENCE, RHODE ISLAND, A CORPORATION OF RHODE ISLAND.

DEVICE FOR CASTELLATING NUTS.

1,315,289. Specification of Letters Patent. Patented Sept. 9, 1919.

Application filed December 6, 1918. Serial No. 265,537.

*To all whom it may concern:*

Be it known that I, GEORGE WILLIAM DOVER, a citizen of the United States, residing at Cranston, in the county of Providence and State of Rhode Island, have invented a new and useful Improvement in Devices for Castellating Nuts, of which the following is a specification.

My invention has reference to an improvement in the manufacture of nuts, and more particularly to an improvement in a device for castellating nuts.

In the usual method of castellating nuts the castellating is done by a revolving cutter. In a nut having six castellations it is necessary to make three separate and distinct cuts or operations of the cutter across the nut and in a nut having eight castellations four operations of the cutter is required and so on, the number of cutting operations increasing with the increasing number of castellations on the nut.

The object of my invention is to improve the construction of a device for castellating nuts, whereby any number of castellations required on a nut, may be performed in one operation of the device, thereby materially reducing the time and cost of castellating nuts.

My invention consists in the peculiar and novel construction of a device for castellating nuts, said device having details of construction as will be more fully set forth hereinafter and claimed.

Figure 1:
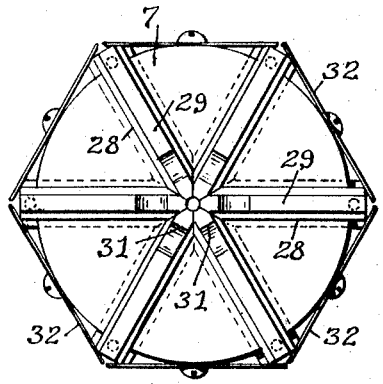
Figure 1 is a face view of the upper member.
Figure 4:
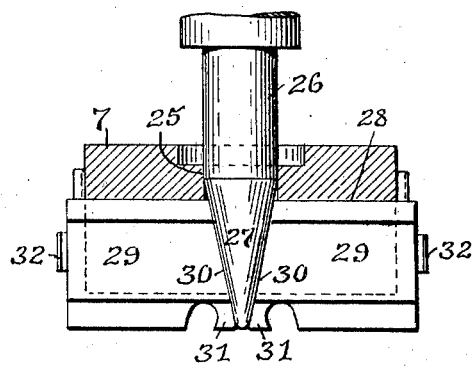
Fig. 4 is a vertical sectional view through the upper and lower members in the open position.
Figure 5:
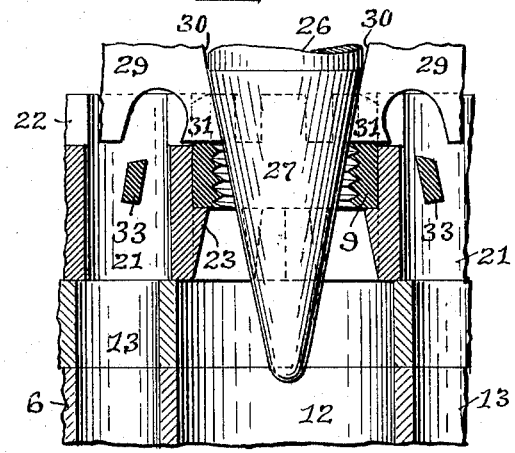
Fig. 5 is an enlarged detail sectional view through the central portion of the device, showing the device closed, the radially sliding nut cutting jaws open and a nut castellated.

In the drawing 6 indicates a relatively fixed lower member, 7 a movable upper member, 8 a nut before castellation and shown in section in Fig. 4, and 9 a nut after castellation and shown in section in Fig. 5.

Figure 2:
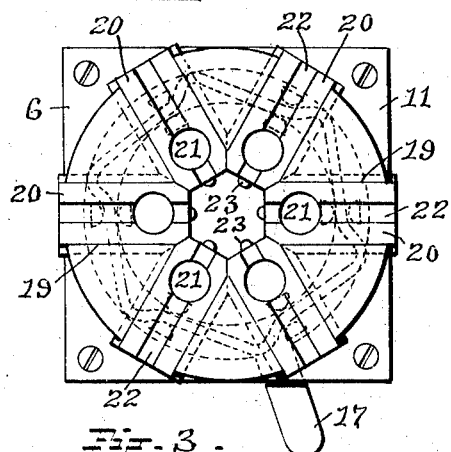
Fig. 2 is a face view of the lower member.
Figure 2:
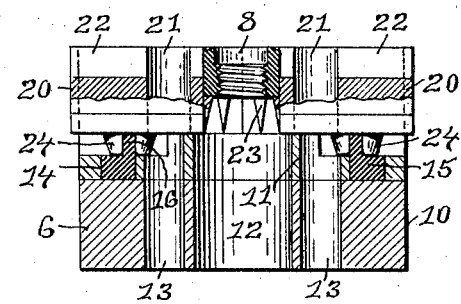
Figure 3:
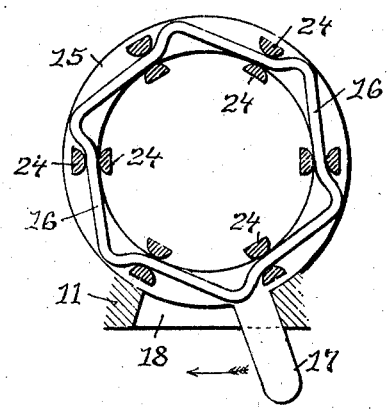
Fig. 3 is a face view of the cam for opening and closing the nut holding and clamping jaws in the lower member and showing a portion of the jaws in section.

The lower member 6 is formed in two horizontal parts 10 and 11, as shown in Fig. 4, secured together by screws, as shown in Fig. 2 or other means. A central hole 12 extends vertically through both parts 10 and 11 and a series of radially disposed vertical holes 13. 13, surrounds the central hole 12 and extends through both parts of the lower member. The upper part 11 has a circular groove 14 in its under face and in which is a circular ring cam 15 having on its upper face a continuous rib forming a series of cam members 16. 16. The cam 15 also has an operating handle 17 which extends out of the member through an opening 18, the ends of the opening forming stops, to limit the opening and closing movement of the cam, as shown in Fig. 3. The upper part 11 has a series of radially disposed undercut guideways 19. 19 in its face, in each of which is slidably supported a nut holding and clamping jaw 20. Each jaw 20 has a vertical hole 21 coinciding with a hole 13 in the member, a longitudinal groove 22 in its top and extending from the inner end of the jaw across the hole 21, the length of the jaw, the slot having the size and shape in cross section, of the piece cut out of a nut, in castellating the nut, a slight projection 23 on the inner end for holding the nut vertically and lugs 24. 24 on its underside which straddle a cam member 16 on the cam 15 as shown in Fig. 4. The inner end of the nut holding jaws 20. 20 are so formed that when the jaws are in their closed positions, the jaws form a central opening, the size and shape of the nut to be castellated, as shown in Fig. 2.

The upper movable member 7 has a central vertical hole 25 in which is a vertically movable plunger 26 having a lower cone-shaped end 27. A series of undercut radial guide-ways 28. 28 are cut in the face of the upper member, corresponding in number and position to the guide-ways in the lower member. Each of the guide-ways 28. 28 slidably support a nut cutting jaw 29 having a beveled inner end 30 fitting against the cone-shaped end 27 of the plunger 26 and an outwardly faced cutter 31 on the beveled end 30, formed by cutting out an adjacent portion of the jaw, as shown in Figs. 4 and 5. The cutter 31, end and face of the jaw extends outward from the face of the member and has a sliding fit in a groove 22 in a coinciding nut holding jaw 20, when the members are closed. A whip spring 32 is secured to the member, by a screw or other means, the free end of a spring engaging with the outer end of each cutting jaw, holds the cutting jaw in the closed position, under spring tension. The distance across the cutters 31. 31, when closed is slightly less than the hole in the nut, as shown in Fig. 4, so that the cutters 31. 31 may enter the nut a predetermined distance, when the members are closed.

When in use, the nut clamping jaws 20. 20 are slightly opened, by moving the cam handle 17 to the left, a nut to be castellated placed in the central opening between the jaws, the nut resting on the jaw projections 23. 23 and the nut clamped in position by the jaws, by moving the cam handle 17 to the right. The members are now closed by bringing the upper member 7 down on to the lower member 6, in a position for the cutting jaws 29. 29 to enter the grooves 22. 22 in the nut holding jaws 20. 20 and for the cutters 31. 31 on the cutting jaws to enter the hole in the nut. The plunger 26 is now forced downward and the cone-shaped end 27 engaging with the beveled ends 30. 30 of the cutting jaws, forces the cutting jaws radially outward and the cutters 31. 31 cutting through the nut, cuts out predetermined pieces 33. 33 of the nut, thereby castellating the nut. The pieces 33. 33 fall down through the holes 21. 21 in the nut holding jaws and the holes 13. 13 in the member into a receptacle, not shown. The members are then opened and the nut holding jaws 20. 20 opened to their limit, by moving the cam handle 17 to the left, thereby releasing the castellated nut, which falls down through the central hole 12 into a receptacle, not shown.

It is evident that any number of castellations may be performed on a nut by varying the number of radial clamping and cutting jaws in the device.

Having thus described my invention I claim as new:—

1. A device for castellating nuts, comprising a lower member having a series of radial guide-ways, a nut clamping jaw in each guide-way, the inner ends of the nut clamping jaws forming, when closed, an opening the shape and size of a nut to be castellated, an upper member having a series of radial guide-ways corresponding in number and position to the radial guide-ways in the lower member, a nut cutting jaw in each radial guide-way in the upper member, each nut cutting jaw having an inner cutting end, adapted to enter a hole in a nut, means for operating the nut clamping jaws in the lower member and means for operating the nut cutting jaws in the upper member.

2. A device for castellating nuts, comprising a lower member having a central vertical hole and a series of radial guide-ways, a nut clamping jaw in each guide-way, the inner end of the jaws forming, when closed, an opening the shape and size of a nut, an upper member having a corresponding number of radial guide-ways, a nut cutting jaw in each guide-way, each nut cutting jaw having an outwardly faced cutter on its inner end adapted to enter a hole in a nut, means for operating the nut clamping jaws and means for operating the nut cutting jaws.

3. A device for castellating nuts, comprising a lower member having a central vertical hole, a series of vertical holes surrounding the central hole, and a series of radial guide-ways, a nut clamping jaw in each guide-way, the inner end of the jaws, when closed, forming an opening the shape of a nut, each jaw having a longitudinal groove in its face, an upper member having a corresponding number of radial guide-ways, a nut cutting jaw in each guide-way, each nut cutting jaw having an outwardly faced cutter on its inner end adapted to enter a hole in a nut and to have a sliding fit in a groove in a corresponding nut clamping jaw, when the members are closed, means for operating the nut clamping jaws and means for operating the nut cutting jaws.

4. A device for castellating nuts, comprising a lower member having a series of radial guide-ways in its face, a nut clamping jaw in each radial guide-way, the inner ends of the jaws, when closed, forming an opening the shape of a nut, each jaw having a longitudinal groove in its face and a nut holding projection on its inner end, an upper member having a corresponding number of radial guide-ways in its face, a nut cutting jaw in each guide-way, each nut cutting jaw having an outwardly faced cutter on its inner end adapted to enter a hole in a nut and to have a sliding fit in a groove in a corresponding nut clamping jaw, when the die is closed, means for operating the nut clamping jaws and means for operating the nut cutting jaws.

5. A device for castellating nuts, comprising a lower member having a series of radial guide-ways in its face, a nut clamping jaw in each guide-way, the inner ends of the jaws, when closed, forming a nut shaped opening, each jaw having a longitudinal groove in its face and a nut holding projection on its inner end, a cam in the lower member and having a series of cam members, means for operatively connecting each clamping jaw with a cam member, means for operating the cam, an upper member having a corresponding number of radial guide-ways in its face, a nut cutting jaw in each guide-way, each nut cutting jaw having an outwardly faced cutter on its inner end adapted to enter a hole in a nut and to have a sliding fit in a groove in a corresponding nut clamping jaw, when the members are closed, and means for operating the nut cutting jaws.

6. A device for castellating nuts, comprising a lower member having a central vertical hole, a series of vertical holes surrounding the central vertical hole, a series of radial guide-ways in its face, a nut clamping jaw in each guide-way forming a nut shape central opening, each jaw having a vertical hole, a longitudinal groove in its face and a nut holding projection on its inner end, a cam in the lower member and having a series of cam members, means for operatively connecting each nut clamping jaw with a cam member, means for operating the cam, an upper member having a corresponding number of radial guide-ways in its face, a nut cutting jaw in each guide-way, each nut cutting jaw having an outwardly faced cutter on its inner end adapted to enter a hole in a nut and to have a sliding fit in a groove in a corresponding nut clamping jaw, when the members are closed, a cone-shaped operating plunger engaging with the inner ends of the nut cutting jaws and a whip spring on the member engaging with the outer end of each nut cutting jaw, as described.

In testimony whereof, I have signed my name to this specification.

GEORGE WILLIAM DOVER.

Copies of this patent may be obtained for five cents each, by addressing the "Commissioner of Patents, Washington, D. C."